United States Patent
Cho et al.

(10) Patent No.: US 8,588,790 B2
(45) Date of Patent: Nov. 19, 2013

(54) APPARATUS AND METHOD FOR OPERATING SMALL CELL IN WIRELESS COMMUNICATION SYSTEM

(75) Inventors: Young-Bo Cho, Seongnam-si (KR); Jae-Hee Cho, Seoul (KR); Byung-Wook Jun, Seoul (KR); Hee-Won Kang, Seongnam-si (KR); Seong-Hyeon Chae, Seongnam-si (KR); Si-Hyun Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 587 days.

(21) Appl. No.: 12/589,950

(22) Filed: Oct. 29, 2009

(65) Prior Publication Data

US 2010/0113036 A1 May 6, 2010

(30) Foreign Application Priority Data

Oct. 31, 2008 (KR) .................. 10-2008-0107462

(51) Int. Cl.
*H04W 36/00* (2009.01)

(52) U.S. Cl.
USPC .......................... 455/444; 455/441

(58) Field of Classification Search
USPC .......... 455/441–444, 449, 436–437; 370/338, 370/331, 349, 329
See application file for complete search history.

(56) References Cited

U.S. PATENT DOCUMENTS

| | | | | |
|---|---|---|---|---|
| 5,513,380 A | * | 4/1996 | Ivanov et al. | 455/441 |
| 5,548,806 A | * | 8/1996 | Yamaguchi et al. | 455/441 |
| 5,640,678 A | * | 6/1997 | Ishikawa et al. | 455/449 |
| 5,822,696 A | * | 10/1998 | Bergkvist | 455/436 |
| 5,907,808 A | * | 5/1999 | Vaara et al. | 455/441 |
| 5,913,168 A | * | 6/1999 | Moreau et al. | 455/441 |
| 5,937,353 A | * | 8/1999 | Fapojuwo | 455/444 |
| 6,192,245 B1 | * | 2/2001 | Jones et al. | 455/437 |
| 6,212,381 B1 | * | 4/2001 | Oda | 455/441 |
| 6,256,500 B1 | * | 7/2001 | Yamashita | 455/441 |
| 6,310,573 B1 | * | 10/2001 | Samuelsson | 342/104 |
| 6,339,590 B2 | * | 1/2002 | Kim | 370/331 |
| 6,954,645 B2 | * | 10/2005 | Tsai et al. | 455/449 |
| 7,570,615 B2 | * | 8/2009 | Bolin et al. | 370/329 |
| 2002/0105932 A1 | * | 8/2002 | Miya | 370/338 |
| 2003/0064727 A1 | * | 4/2003 | Tsai et al. | 455/449 |
| 2005/0075110 A1 | * | 4/2005 | Posti et al. | 455/452.1 |
| 2007/0140185 A1 | * | 6/2007 | Garg et al. | 370/338 |
| 2008/0153497 A1 | * | 6/2008 | Kalhan | 455/436 |
| 2010/0113002 A1 | * | 5/2010 | Joko et al. | 455/422.1 |
| 2010/0278144 A1 | * | 11/2010 | Olofsson et al. | 370/331 |

* cited by examiner

*Primary Examiner* — Jinsong Hu
*Assistant Examiner* — Nathan Taylor

(57) ABSTRACT

A Handover apparatus and method of a Mobile Station (MS) in a wireless communication system in which at least one small cell resides in a macro cell includes, when entering a neighboring small cell, checking a movement speed of the MS. The method also includes determining whether to hand over to the small cell by taking into account the movement speed of the MS. When it is determined not to hand over to the small cell, that MS transmits small cell penetration information to a macro Base Station (BS); allocates a macro only resource from the macro BS; and communicates with the macro BS in the small cell using the macro only resource allocated from the macro BS.

16 Claims, 9 Drawing Sheets

APPARATUS AND METHOD FOR OPERATING SMALL CELL IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 31, 2008 and assigned Serial No. 10-2008-0107462, the entire disclosure of which is hereby incorporated by reference.

TECHNICAL FIELD OF THE INVENTION

The present invention relates generally to an apparatus and a method for operating a small cell in a wireless communication system. More particularly, the present invention relates to an apparatus and a method for supporting a selective handover of a terminal between a macro cell and a small cell in a wireless communication system including the macro cell and the small cells.

BACKGROUND OF THE INVENTION

Wireless communication systems are subject to unsmooth communications of a terminal and a base station because of a geographical condition in a cell, a distance between the terminal and the base station, or movement of the terminal.

To address this problem, the wireless communication system provides a small cell service to provide high speed data services to users within a macro cell. The wireless communication system, including the macro cell and the small cells, is configured as shown in FIG. 1.

FIG. 1 illustrates a conventional wireless communication system including a macro cell and small cells.

The wireless communication system of FIG. 1 includes a macro Base Station (BS) 100 managing the macro cell, and hot zone BSs 110 and 120 managing the small cells.

The hot zone BSs 110 and 120 use the same frequency band as the macro BS 100. The plurality of the adjacent hot zone BSs can be operated as a single hot zone BS group 120.

When the wireless communication system includes the macro cell and the small cells that use the same frequency band, a Mobile Station (MS) cannot maintain the connection to the macro BS within the small cell. Hence, the wireless communication system supports handover between the macro cell and the small cell to service the seamless communication to the MS. For example, the MS performs the handover as shown in FIG. 2.

FIG. 2 illustrates the handover of the MS in the conventional wireless communication system.

When the wireless communication system covers the macro cell and the small cells as shown in FIG. 2, the MS is handed-over to its cell. For example, when the MS 220 travels in the service coverage of the macro BS 200, the MS 220 is serviced by accessing the macro BS 200.

When the MS 220 migrates to the service coverage of the first hot zone BS 210, the MS 220 is handed-over to the first hot zone BS 210.

As discussed above, the wireless communication system, including the macro cell and the small cells, supports the handover between the macro cell and the small cells to offer the seamless communication to the terminal. The wireless communication system, including the macro cell and the small cells, confronts the frequent handovers of the MS, as compared with a wireless communication system including only the macro cell. Accordingly, the wireless communication system, including the macro cell and the small cells, suffers from the overhead increase according to the handover.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, an aspect of the present invention is to provide an apparatus and a method for reducing overhead in handover of a mobile station in a wireless communication system including a macro cell and small cells.

Another aspect of the present invention is to provide an apparatus and a method for a selective handover of a mobile station in a wireless communication system including a macro cell and small cells.

Yet another aspect of the present invention is to provide an apparatus and a method for a selective handover according to a movement speed of a mobile station in a wireless communication system including a macro cell and small cells.

Still yet another aspect of the present invention is to provide an apparatus and a method for a terminal in a small cell to communicate with a macro base station without interference in a wireless communication system including a macro cell and small cells.

A further aspect of the present invention is to provide an apparatus and a method for a terminal accessed to a macro base station to selectively perform a hand over in a wireless communication system including a macro cell and small cells.

A further aspect of the present invention is to provide an apparatus and a method for a terminal accessed to a hot zone base station to selectively perform a hand over in a wireless communication system including a macro cell and small cells.

According to one aspect of the present invention, a handover method of a Mobile Station (MS) in a wireless communication system in which at least one small cell resides in a macro cell includes when entering a neighboring small cell, checking a movement speed of the MS; determining whether to hand over to the small cell by taking into account the movement speed of the MS; when determining not to hand over to the small cell, transmitting small cell penetration information to a macro Base Station (BS); allocating a macro only resource from the macro BS; and communicating with the macro BS in the small cell using the macro only resource allocated from the macro BS.

According to another aspect of the present invention, a resource allocation method of a macro Base Station (BS) in a wireless communication system in which at least one small cell resides in a macro cell includes when receiving small cell penetration information from an MS, allocating a macro only resource not used by the small cell to the MS; and communicating with the MS traveling in the small cell using the macro only resource allocated to the MS.

According to yet another aspect of the present invention, a resource allocation method of a small BS in a wireless communication system in which at least one small cell resides in a macro cell includes when receiving allocation information of a macro only resource not used by a small cell, from a macro BS, controlling not to use the macro only resource; when receiving deallocation information of the macro only resource from the macro BS, checking whether there exists an MS which uses the macro only resource; and when there exists no MS which uses the macro only resource, controlling to use the macro only resource.

According to still another aspect of the present invention, an apparatus of an MS in a wireless communication system in which at least one small cell resides in a macro cell includes a speed measurer configured to check a movement speed of the MS; a BS checker configured to identify a BS of a service coverage the MS enters; and a controller configured to, when the BS checker confirms entrance to a neighboring small cell, determine whether to perform a handover to the small cell by taking into account the movement speed of the MS checked by the speed measurer, and configured to control to communicate with a macro BS in the entered small cell using a macro only resource allocated by transmitting small cell penetration information to the macro BS when determining not to hand over to the small cell.

According to a further aspect of the present invention, an apparatus of a macro BS in a wireless communication system in which at least one small cell resides in a macro cell includes a scheduler configured to, when small cell penetration information is received from an MS through a receiver, allocate a macro only resource not used by the small cell to the MS; a transmitter configured to transmit a signal to the MS traveling in the small cell using the macro only resource allocated by the scheduler to the MS; and the receiver configured to receive a signal from the MS traveling in the small cell using the macro only resource allocated by the scheduler to the MS.

According to a further aspect of the present invention, an apparatus of a small BS in a wireless communication system in which at least one small cell resides in a macro cell includes a receiver configured to receive a signal from a MS; a transmitter configured to transmit a signal to the MS; a wired interface configured to communicate with a macro BS and at least one small BS; and a controller configured to, when allocation information of a macro only resource not used by a small cell is received from the macro BS through the wired interface, control not to use the macro only resource, and when deallocation information of the macro only resource is received from the macro BS and there exists no MS which uses the macro only resource, configured to control to use the macro only resource.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 3 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for supporting a selective handover of a Mobile Station (MS) in a wireless communication system including a macro cell and a small cell.

Hereinafter, it is assumed that the macro cell and the small cell of the wireless communication system use the same frequency band. The small cell is a referred to as a hot zone, and a Base Station (BS) managing the hot zone is referred to as a hot zone BS.

To avoid frequent handovers between the macro cell and the hot zones, the MS of the wireless communication system selectively hands over by taking into account its movement speed.

Figure 1:
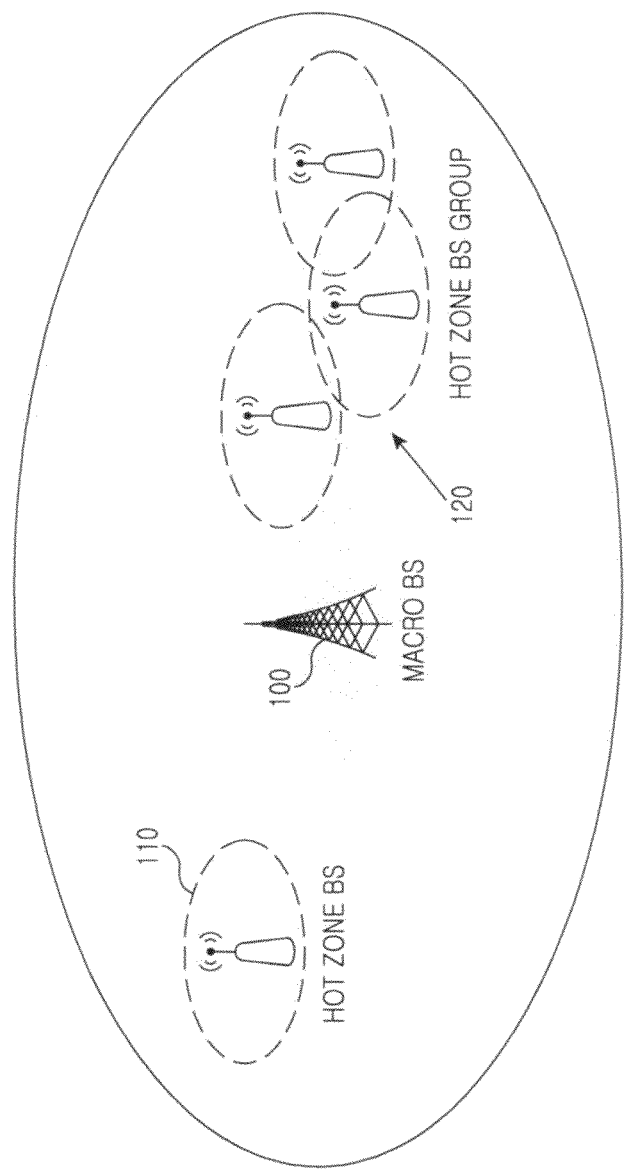
FIG. 1 illustrates a diagram of a conventional wireless communication system including macro cell and small cells.
Figure 2:
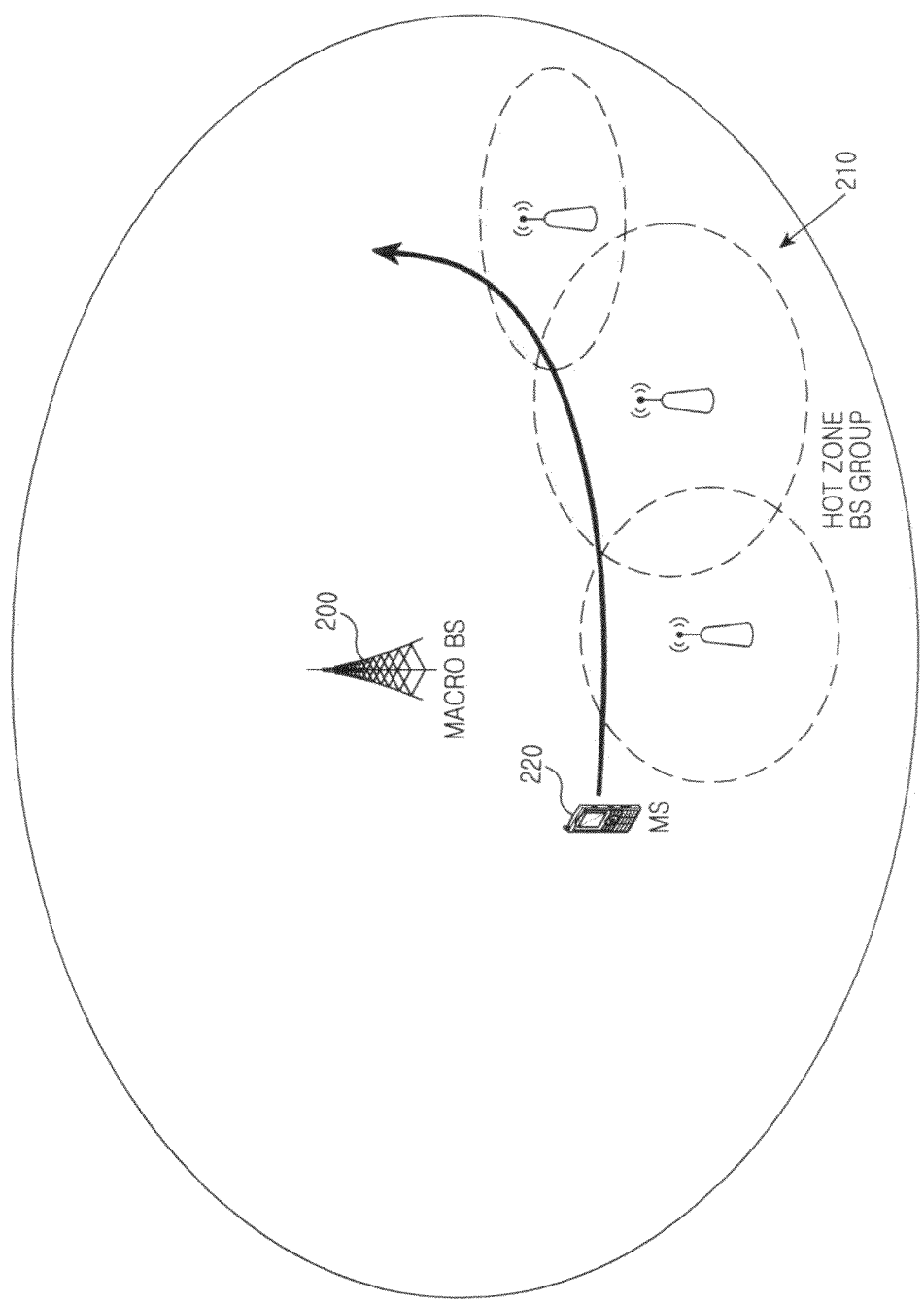
FIG. 2 illustrates a diagram of handover of a Mobile Station (MS) in the conventional wireless communication system
Figure 3:
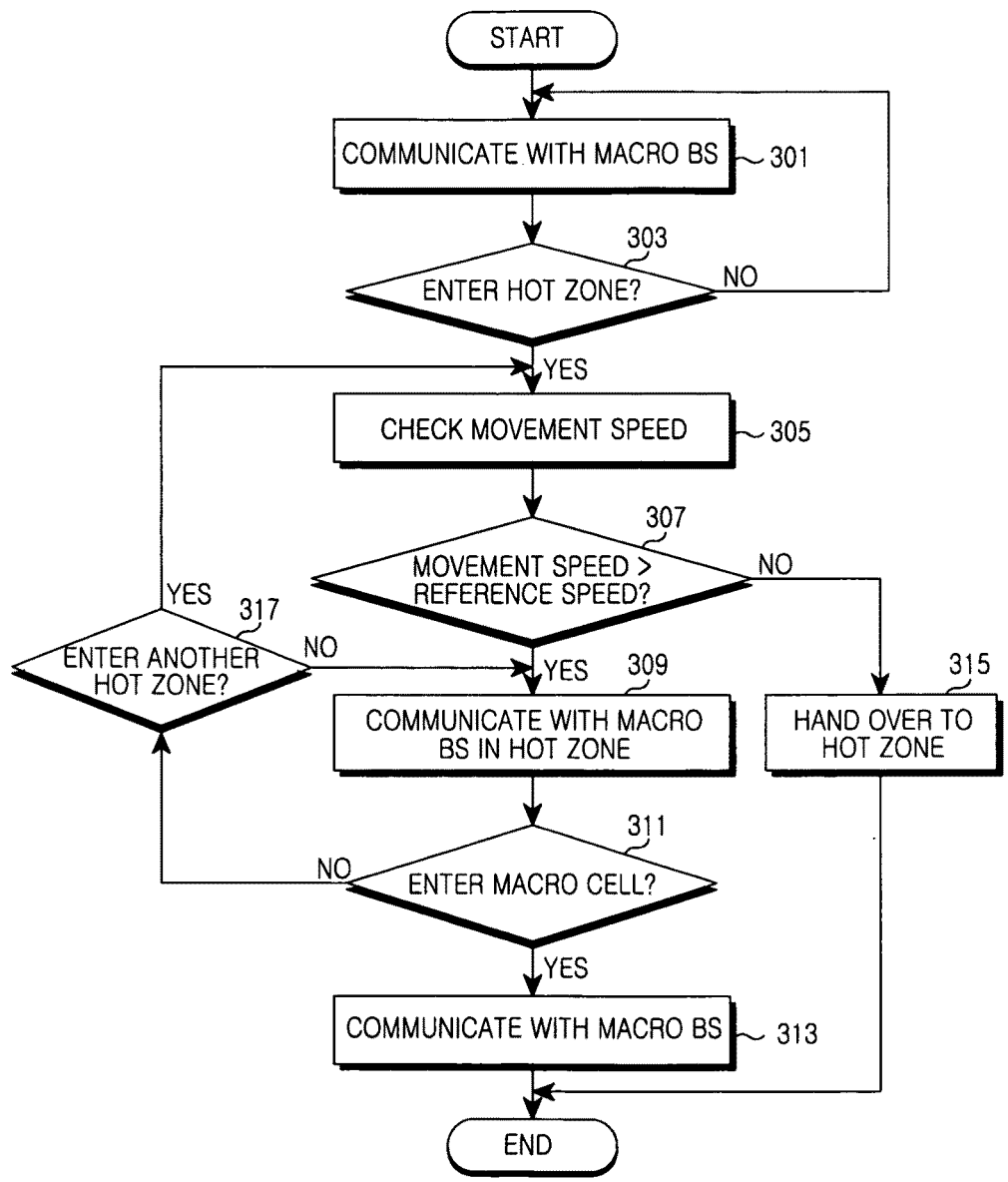
FIG. 3 illustrates a flowchart of a selective handover method of an MS in a wireless communication system according to an exemplary embodiment of the present invention.

The MS serviced by a macro BS selectively hands over as shown in FIG. 3.

FIG. 3 illustrates a flowchart of the selective handover method of the MS in the wireless communication system according to an exemplary embodiment of the present invention.

In step 301, the MS communicates by accessing the macro BS. Herein, the macro BS represents the BS that manages the macro cell.

In step 303, the MS checks whether it enters the hot zone. For instance, when detecting a control signal of the hot zone BS, the MS determines the entrance to the hot zone. Herein, the hot zone resides in the macro cell managed by the BS that the MS accesses.

When not entering the hot zone, the MS goes back to step 301 and sustains the access to the macro BS.

By contrast, upon entering the hot zone, the MS checks its movement speed in step 305. For example, the MS can acquire its movement speed using a Global Positioning System (GPS). Alternatively, the MS may check the movement speed using a network based movement speed estimation scheme.

In step 307, the MS compares the movement speed acquired in step 305 with a reference speed so as to determine whether to hand over to the hot zone entered in step 303.

When the movement speed of the MS is lower than or equal to the reference speed, the MS determines that the handover does not frequently happen. Hence, the MS hands over to the entered hot zone in step 315.

Conversely, when the movement speed of the MS is higher than the reference speed, the MS determines the frequent handovers. Hence, the MS sustains the access to the macro BS within the hot zone in step 309.

Thereafter, the MS determines whether it enters the macro cell in step 311.

When not entering the macro cell, the MS checks whether it enters another hot zone in step 315.

When not entering another hot zone in step 315, the MS returns to step 309 to sustain the access to the macro BS within the hot zone.

When entering another hot zone in step 315, the MS rechecks its movement speed in step 305.

While entering the macro cell in step 311, the MS maintains the access to the macro BS in step 313. Herein, the macro cell that the MS enters indicates the macro cell managed by the macro BS.

Thereafter, the MS finishes this process.

Figure 4:
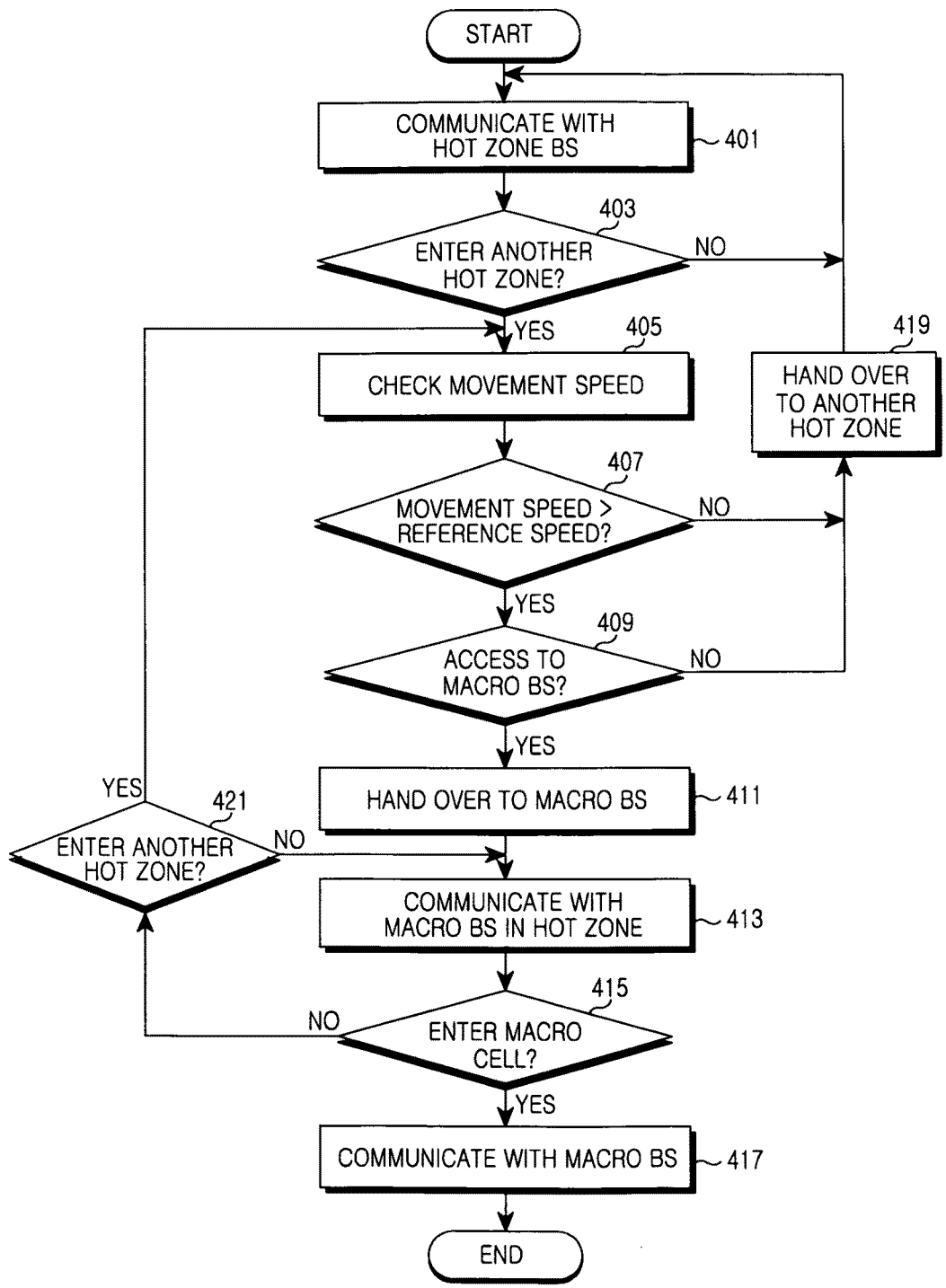
FIG. 4 illustrates a flowchart of a selective handover method of the MS in the wireless communication system according to another exemplary embodiment of the present invention.

The MS serviced by the hot zone BS selectively hands over as shown in FIG. 4.

FIG. 4 illustrates a flowchart of a selective handover method of the MS in the wireless communication system according to another exemplary embodiment of the present invention.

In step 401, the MS communicates by accessing the hot zone BS.

In step 403, the MS checks whether it enters another hot zone. For instance, when detecting a control signal of another hot zone BS, the MS determines the entrance to the other hot zone.

When not entering another hot zone, the MS goes back to step 401 and sustains the access to the hot zone BS. Although it is not illustrated in FIG. 4, when not entering another hot zone, the MS checks whether it enters the macro cell. When not entering the macro cell, the MS maintains the access to the hot zone BS back in step 401. By contrast, when entering the macro cell, the MS hands over to the entered macro cell.

Upon entering another hot zone in step 403, the MS checks its movement speed in step 405.

In step 407, the MS compares the acquired movement speed with a reference speed.

When the movement speed of the MS is lower than or equal to the reference speed, the MS determines that the handover does not frequently happen. Hence, the MS hands over to the other entered hot zone in step 419.

Conversely, when the movement speed of the MS is higher than the reference speed, the MS determines the frequent handovers. Hence, the MS determines whether it can hand over to the macro cell in step 409. For example, the MS determines whether it can access to the macro BS by taking into account a receive signal intensity of the macro BS. Herein, the macro cell includes the hot zone that the MS accesses.

When unable to handover to the macro BS in step 409, the MS hands over to another hot zone entered in step 419.

When able to handover to the macro BS in step 409, the MS hands over to the macro cell in step 411.

In step 413, the MS communicates with the macro BS to which the MS hands over in step 411, within the hot zone. At this time, the resource for the MS to communicate with the macro BS is limited to a macro only resource.

Thereafter, the MS checks whether it enters the macro cell in step 415. In other words, the MS that accesses the macro BS within the hot zone is limited in the available resources for the communication with the macro BS. Namely, the MS that accessed the macro BS within the hot zone communicates with the macro BS using the macro only resources alone. Accordingly, to check whether it is possible to change the resource usable for the communication with the macro BS, the MS determines whether it enters the macro cell in step 415.

When not entering the macro cell in step 415, the MS checks whether it goes into another hot zone in step 421.

When not going into another hot zone in step 421, the MS returns to step 413 and maintains the access to the macro BS within the hot zone in step 413.

Meanwhile, upon entering another hot zone in step 421, the MS checks its movement speed in step 415.

As entering the macro cell in step 415, the MS sustains the access to the macro BS within the macro cell in step 417. At this time, the resource usable by the MS for the communication with the macro BS is not limited to the macro only resource.

Thereafter, the MS finishes this process.

As stated above, when expecting the frequent handovers between the macro cell and the hot zone based on the movement speed, the MS communicates with the macro BS in the hot zone as well. In so doing, since the macro cell and the hot zone use the same frequency band, the MS communicating with the macro BS in the hot zone is interfered by signals of the hot zone BS. To allow the MS to communicate with the macro BS without the interference from the signals of the hot zone BS within the hot zone, the wireless communication system conducts the communication using a frame of FIG. 5. Hereafter, the frame of a Time Division Duplex (TDD) system is illustrated by way of example. Notably, the present invention can be applied to a Frequency Division Duplex (FDD) system in the same manner.

Figure 5:
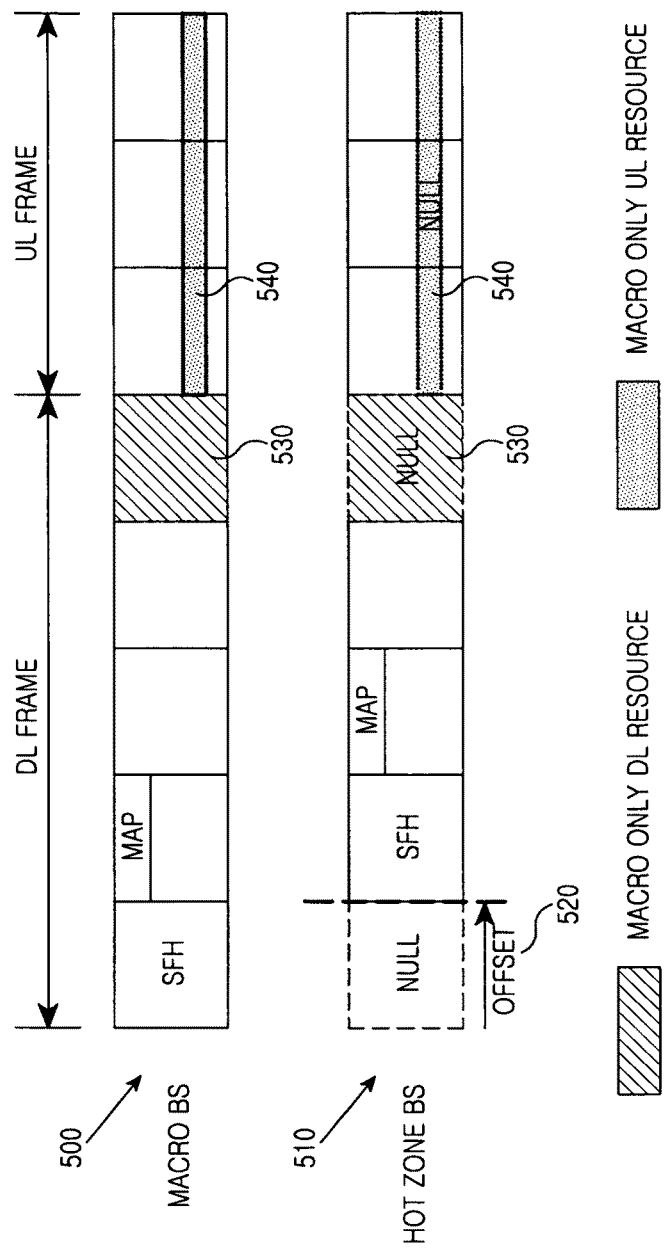
FIG. 5 illustrates a diagram of a frame structure of the wireless communication system according to an exemplary embodiment of the present invention.

The frame structure of the TDD system can be constituted with a frame including a plurality of small frames and a superframe including a plurality of frames. Herein, one small frame includes a plurality of Orthogonal Frequency Division Multiplexing (OFDM) symbols. For example, the superframe includes 4 frames and one frame includes 8 small frames. One small frame includes 6 OFDM symbols. FIG. 5 shows the first frame of the superframe by way of example.

FIG. 5 illustrates a frame structure of the wireless communication system according to an exemplary embodiment of the present invention.

A macro BS frame 500 and a hot zone BS frame 510 include 8 small frames as shown in FIG. 5. The front 5 small frames of the 8 small frames of the frames 500 and 510 constitute a downlink frame, and the remaining 3 small frames constitute an uplink frame.

The macro BS frame 500 includes a region for carry a superframe header in the first small frame of the downlink frame. The hot zone BS frame 510 sets an offset 520 of the superframe header based on the superframe header region of the macro BS frame 500. That is, the hot zone BS frame 510 puts the region for carrying the superframe header after the offset 520 defined based on the superframe header region of the macro BS frame 500. Hence, the MS communicating with the macro BS within the hot zone, is able to receive system information of the macro BS without interference of the hot zone BS. Herein, the superframe header includes a preamble, a Primary Broadcast Channel (PBCH), a Secondary Broadcast Channel (SBCH), and so forth.

Since the macro BS and the hot zone BS transmit resource allocation information using different time resources according to the offset 520 of the superframe, the interference between the macro BS and the hot zone BS can be alleviated. Herein, the resource allocation information includes MAP.

The macro BS frame 500 allocates some time resources of the downlink frame to a macro only downlink resource region 530. For example, the macro BS frame 500 includes the macro only downlink resource region 530 allocated on the small frame basis in a Time Division Multiplexing (TDM) manner. Herein, the macro only downlink resource region 530 indicates a resource region for the MS which communicates with the macro BS within the hot zone.

The macro BS frame 500 allocates some frequency resources of the uplink frame to a macro only uplink resource region 540. For example, the macro BS frame 500 includes the macro only uplink resource region 540 allocated on the subcarrier basis in a Frequency Division Multiplexing (FDM) manner. Accordingly, the MS can address the restricted service coverage caused by the limited transmit power. Herein, the macro only uplink resource region 540 indicates a resource region for the MS which communicates with the macro BS within the hot zone.

The hot zone BS frame 510 constitutes macro only resource regions 530 and 540 as null in order to mitigate the interference between the MS communicating with the macro BS within the hot zone and the hot zone BS. That is, the hot zone BS does not use the macro only resource regions 530 and 540.

In this exemplary embodiment of the present invention, the macro BS frame 500 and the hot zone BS frame 510 define the macro only resource regions 530 and 540. The macro BS allocates the macro only resources 530 and 540 only to the MS communicating with the macro BS in the hot zone. The hot zone BS does not use the macro only resources 530 and 540.

Alternatively, when there is no MS which communicates with the macro BS in the hot zone, the macro BS and the hot zone BS may use the macro only resources 530 and 540 like the other resources.

Now, explanations provide a method for allocating the macro only resource to the MS communicating with the macro BS in the hot zone.

Figure 6:
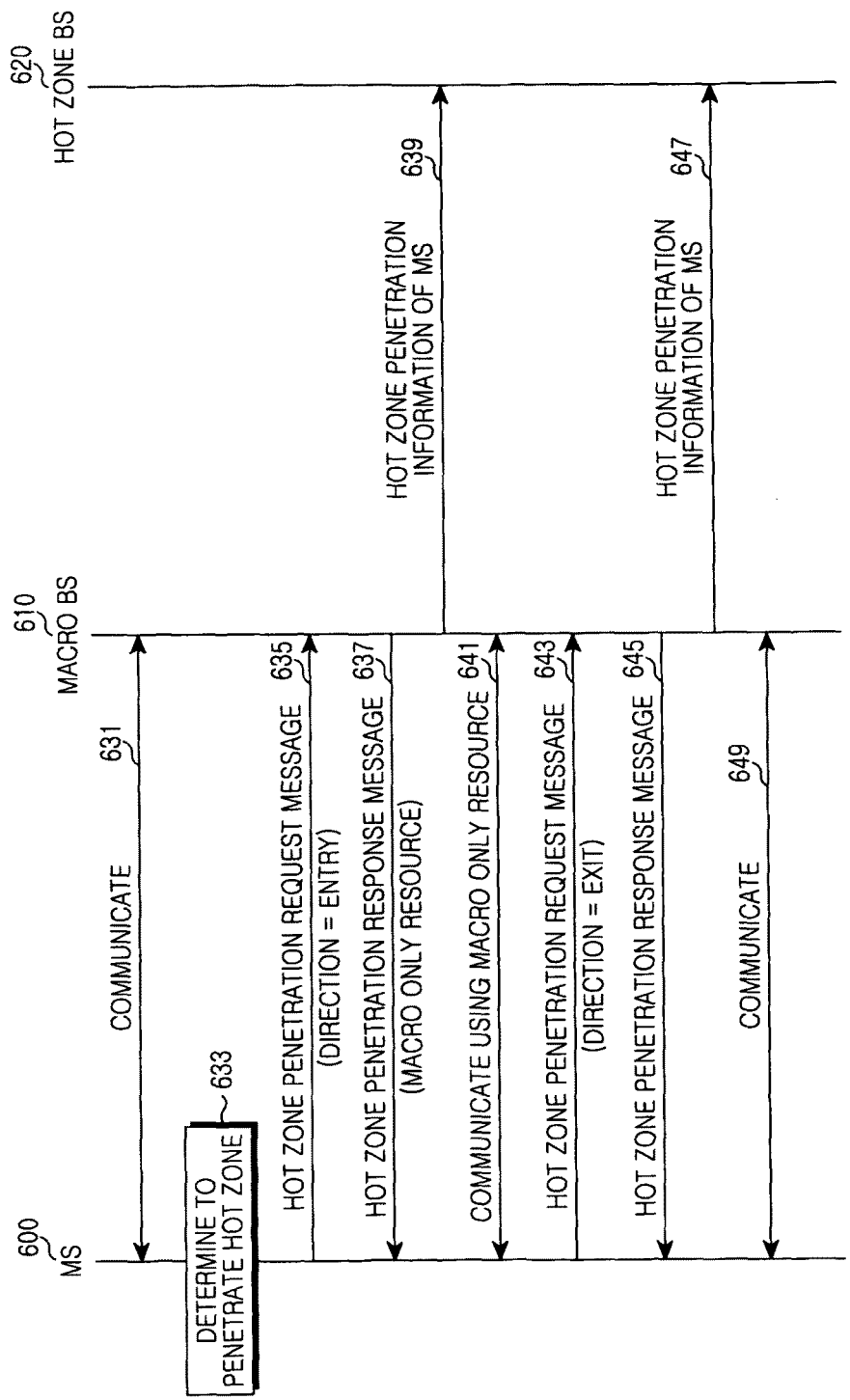
FIG. 6 illustrates a diagram of the handover of the MS in the wireless communication system according to an exemplary embodiment of the present invention.

When the MS serviced by the macro BS maintains the communication even in the hot zone, the macro BS allocates the macro only resource as shown in FIG. 6.

FIG. 6 illustrates the handover method of the MS in the wireless communication system according to an exemplary embodiment of the present invention.

The wireless communication system of FIG. 6 includes an MS 600, a macro BS 610, and a hot zone BS 620. The hot zone BS 620 resides in the service coverage of the macro BS 610.

The MS 600 communicates by accessing the macro BS 610 in step 631.

Upon entering the service coverage of the hot zone BS 620, the MS 600 determines whether to hand over to the hot zone BS 620 by taking into account its movement speed. For instance, when the movement speed of the MS 600 is lower than or equal to the reference speed, the MS 600 determines that the handover does not frequently happen. Hence, the MS 600 determines to handover to the hot zone BS 620. Conversely, when the movement speed of the MS 600 is higher than the reference speed, the MS 600 determines the frequent handovers. Thus, the MS 600 determines to maintain the communication with the macro BS 610 in the hot zone. That is, the MS 600 determines to pass through the hot zone without handing over to the hot zone BS 620.

Determining to pass through the hot zone in step 633, the MS 600 sends a hot zone penetration request message to the macro BS 610 in step 635. Herein, the hot zone penetration request message includes hot zone entry information of the MS 600, information of the hot zone BS 620 that the MS 600 enters, and so forth.

In response to receiving the hot zone penetration request message, the macro BS 610 checks whether it can allocate the macro only resource to the MS 600. When the macro only resource can be allocated to the MS 600, the macro BS 610 allocates the macro only resource to the MS 600.

Next, the macro BS 610 sends a hot zone penetration response message to the MS 600 in step 637. Herein, the hot zone penetration response message includes information of whether the macro only resource can be allocated to the MS 600 and information of the macro only resource allotted to the MS 600.

In step 639, the macro BS 610 transmits information for hot-zone communicating with the MS 600, to the hot zone BS 620 in step 639. For example, the macro BS 610 transmits the information for hot-zone communicating with the MS 600, to the hot zone BS 620 over a backbone network. The macro BS 610 and the hot zone BS 620 can adjust the magnitude of the macro only resource by periodically or intermittently sharing information of the macro only resource over the backbone network. Herein, the hot zone communication indicates communications between the macro BS 610 and the MS 600 traveling in the service coverage of the hot zone BS 620.

According to the hot zone communication information received from the macro BS 610, the hot zone BS 620 does not transmit or receive signals using the macro only resource.

The MS 600 determines based on the hot zone penetration response message, whether the macro BS 610 allocates the macro only resource to the MS 600. When the macro BS 610 allocates the macro only resource, the MS 600 hot-zone communicates with the macro BS 610 using the macro only resource allocated from the macro BS in step 641. In so doing, the macro BS 610 and the hot zone BS 620 transmit the system information and the resource allocation information using the different time resources as shown in FIG. 5. The hot zone BS 620 does not utilize the macro only resource. Thus, the MS 600 can carry out the hot zone communication without interference from signals of the hot zone BS 620.

Next, upon entering the service coverage of the macro BS 610, the MS 600 sends the hot zone penetration request message to the macro BS 610 in step 643. Herein, the hot zone penetration request message includes hot zone exist information of the MS 600 and information of the hot zone BS 620 which the MS 600 exits.

Upon receiving the hot zone penetration request message, the macro BS 610 allocates the resource other than the macro only resource to the MS 600. Alternatively, when there is no MS which uses the macro only resource, the macro BS 610 may not change the macro only resource allocated to the MS 600.

In step 645, the macro BS 610 sends a hot zone penetration response message to the MS 600. Herein, the hot zone penetration response message includes information of the resource allocated to the MS 600.

The macro BS 610 transmits deallocation information of the macro only resource for the MS 600, to the hot zone BS 620 in step 647. For example, the macro BS 610 transmits the deallocation information of the MS 600 for the macro only resource to the hot zone BS 620 over the backbone network.

From the deallocation information of the MS 600 for the macro only resource received from the macro BS 610, the hot zone BS 620 determines whether there exists MS which uses the macro only resource. Detecting that no MS is present that uses the macro only resource, the hot zone BS 620 may utilize the macro only resource.

Based on the hot zone penetration response message, the MS 600 confirms the resource allocated by the macro BS 610. Next, the MS 600 communicates with the macro BS 610 using the resource allocated by the macro BS 610 in step 649.

Figure 7:
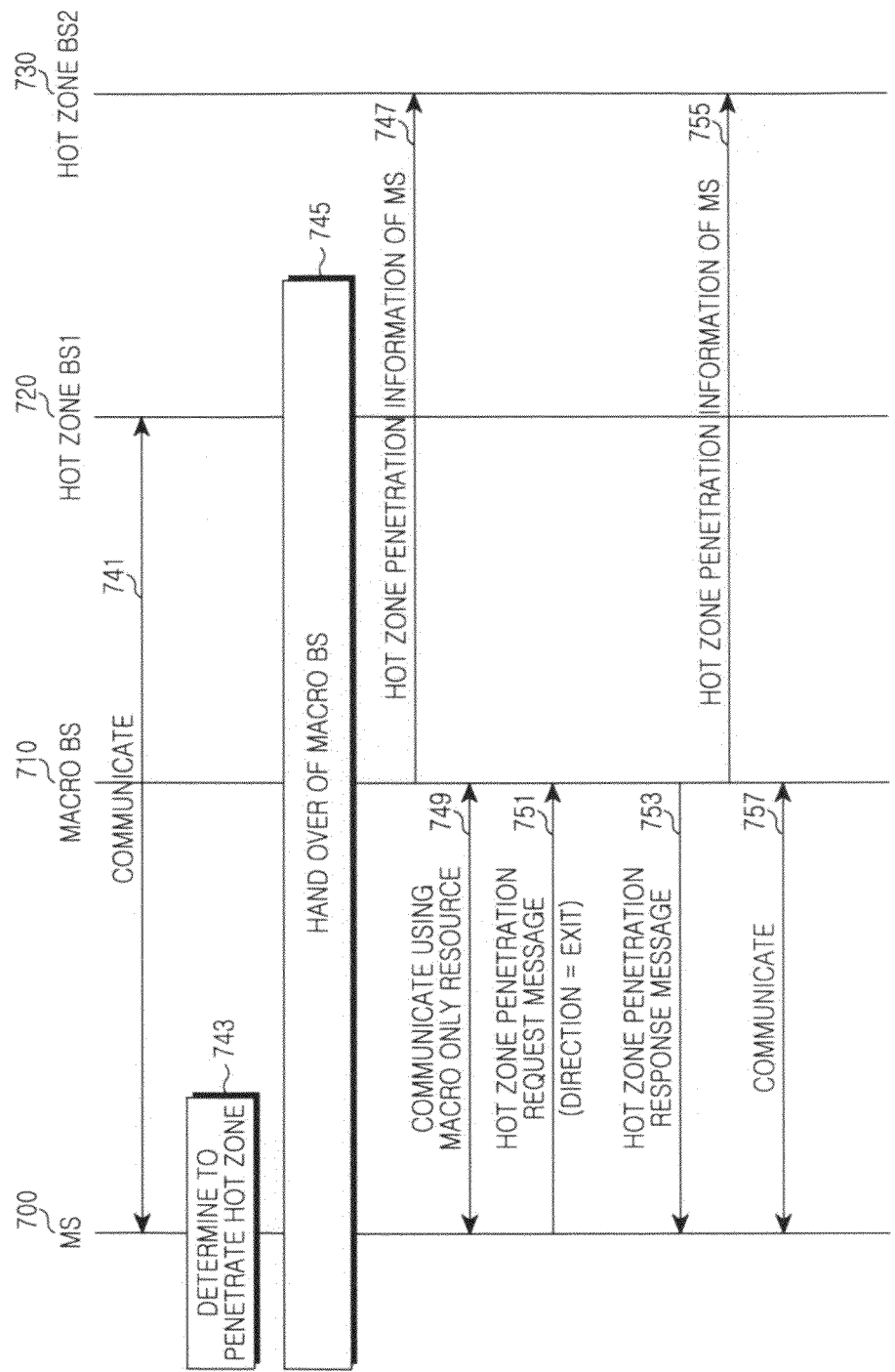
FIG. 7 illustrates a diagram of the handover of the MS in the wireless communication system according to another exemplary embodiment of the present invention.

To allow the MS serviced by the hot zone BS to communicate with the macro BS in the hot zone, the macro BS allocates the macro only resource as shown in FIG. 7.

FIG. 7 illustrates the handover of the MS in the wireless communication system according to another exemplary embodiment of the present invention.

The wireless communication system of FIG. 7 includes an MS 700, a macro BS 710, a first hot zone BS 720, and a second hot zone BS 730. The first hot zone BS 720 and the second hot zone BS 730 reside in the service coverage of the macro BS 710.

The MS 700 communicates by accessing the first hot zone BS 720 in step 741.

Entering the service coverage of the second hot zone BS 730, the MS 700 determines whether to hand over to the second hot zone BS 730 by taking into account its movement speed. For example, when the movement speed of the MS 700 is lower than or equal to the reference speed, the MS 700 determines that the handover does not frequently happen. Hence, the MS 700 determines to handover to the second hot zone BS 730. By contrast, when the movement speed of the MS 700 is higher than the reference speed, the MS 700 determines the frequent handovers. Hence, the MS 700 determines to hand over to the macro BS 710 within the service coverage of the second hot zone BS 730. That is, the MS 700 determines to go through the hot zone without handing over to the second hot zone BS 730.

Upon determining to go through the hot zone in step 743, the MS 700 hands over to the macro BS 710 in step 745. For example, the MS 700 checks whether it can access the macro BS 710 by taking into account the receive signal intensity of the macro BS 710. When unable to access the macro BS 710, the MS 700 hands over to the second hot zone BS 730. When able to access the macro BS 710, the MS 700 hands over to the macro BS 710.

When handing over to the macro BS 710 in step 745, the MS 700 informs the macro BS 710 of the handover to the macro BS 710 within the service coverage of the second hot zone BS 730. For example, the MS 700 transmits the hot zone penetration information to the macro BS 710. Upon confirming the hot zone communication with the MS 700 accessing through the handover, the macro BS 710 allocates the macro only resource to the MS 700.

In step 747, the macro BS 710 transmits the information for the hot zone communication with the MS 700, to the second hot zone BS 730. For example, the macro BS 710 transmits the information for the hot zone communication with the MS 700, to the second hot zone BS 730 over the backbone network. The macro BS 710, the first hot zone BS 720, and the second hot zone BS 730 can adjust the magnitude of the macro only resource by periodically or intermittently sharing the information of the macro only resource over the backbone network. Herein, the hot zone communication indicates the communication between the macro BS 710 and the MS 700 traveling in the service coverage of the second hot zone BS 730.

According to the information for the hot zone communication received from the macro BS 710, the second hot zone BS 730 does not transmit and receive signals using the macro only resource.

The MS 700 hot-zone communicates with the macro BS 710 using the macro only resource allocated from the macro BS 710 in step 749. The macro BS 710 and the second hot zone BS 730 transmit the system information and the resource allocation information using the different time resources as shown in FIG. 5. The second hot zone BS 730 does not utilize the macro only resource. Accordingly, the MS 700 can perform the hot zone communication with the macro BS 710 without being interfered by the signals of the second hot zone BS 730.

Upon entering the service coverage of the macro BS 710, the MS 700 sends a hot zone penetration request message to the macro BS 710 in step 751. Herein, the hot zone penetration request message includes the hot zone exit information of the MS 700 and the information of the second hot zone BS 730 which the MS 700 exits.

Receiving the hot zone penetration request message, the macro BS 710 allocates the resource other than the macro only resource to the MS 700. Alternatively, when no MS using the macro only resource exists, the macro BS 710 may not change the macro only resource allocated to the MS 700.

In step 753, the macro BS 710 sends a hot zone penetration response message to the MS 700. The hot zone penetration response message includes the information of the resource allocated to the MS 700.

The macro BS 710 transmits the macro only resource deallocation information of the MS 700 to the second hot zone BS 730 in step 755. For example, the macro BS 710 transmits the macro only resource deallocation information of the MS 700 to the second hot zone BS 730 over the backbone network.

From the macro only resource deallocation information of the MS 700 received from the macro BS 710, the second hot zone BS 730 checks whether an MS using the macro only resource exists. Detecting that no MS uses the macro only resource, the second hot zone BS 730 may utilize the macro only resource.

The MS 700 confirms the resource allocated by the macro BS 710 from the hot zone penetration response message. Using the resource allocated from the macro BS 710, the MS 700 communicates with the macro BS 710 in step 757.

In this exemplary embodiment, it has been assumed that the MS enters the service coverage of the hot zone BS or migrates from the service coverage of the hot zone BS to the macro cell. Yet, the present invention is applicable to a case where the MS enters the service coverage of the hot zone BS group or migrates from the service coverage of the hot zone BS group to the macro cell.

A structure of the MS for selectively handing over based on the movement speed is now described.

Figure 8:
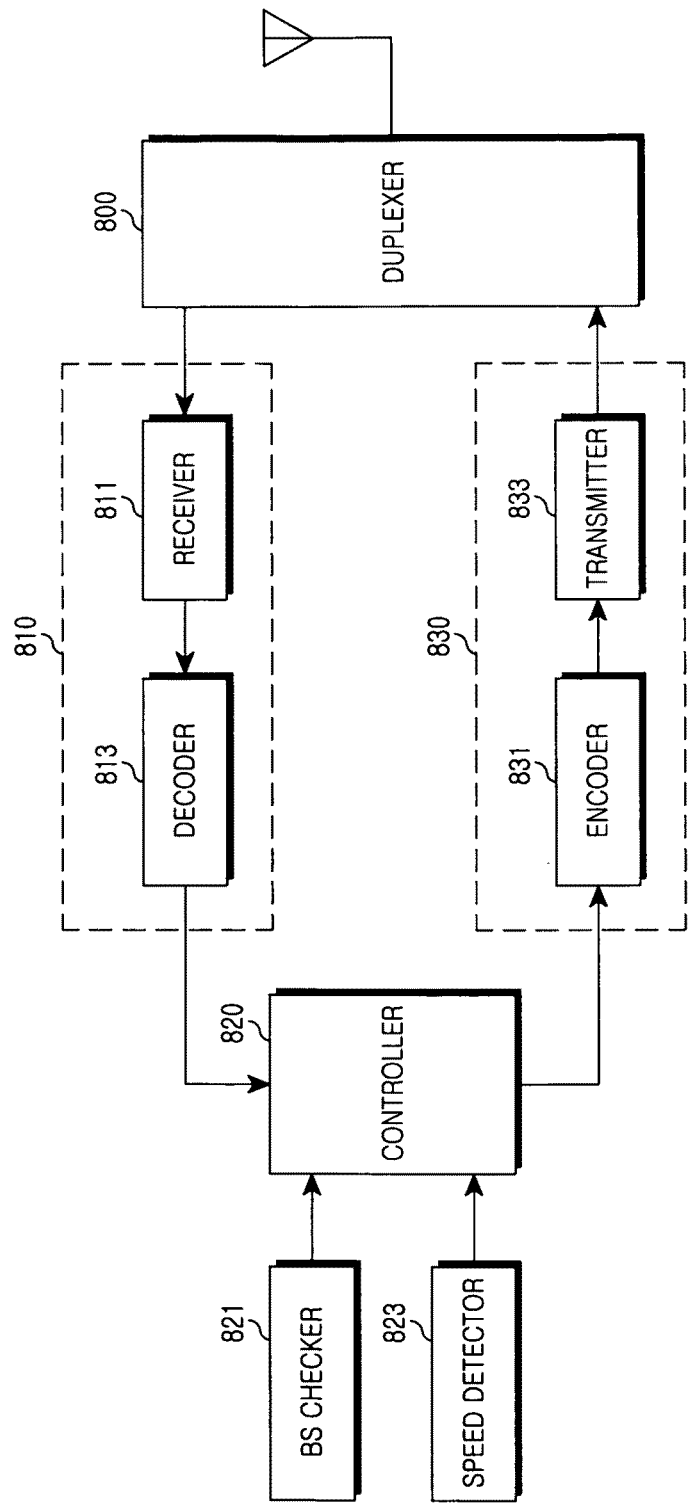
FIG. 8 illustrates a block diagram of the MS in the wireless communication system according to an exemplary embodiment of the present invention.

FIG. 8 illustrates a block diagram of the MS in the wireless communication system according to an exemplary embodiment of the present invention.

The MS of FIG. 8 includes a duplexer 800, a receiving apparatus 810, a controller 820, a BS checker 821, a speed detector 823, and a transmitting apparatus 830.

The duplexer 800 sends a transmit signal output from the transmitting apparatus 830 over an antenna and provides a receive signal from the antenna to the receiving apparatus 810 in the duplex manner.

The receiving apparatus 810 includes a receiver 811 and a decoder 813.

The receiver 811 converts a Radio Frequency (RF) signal output from the duplexer 800 to a baseband signal. For example, using an OFDM scheme, the receiver 811 includes an RF processor and an OFDM demodulator. The RF processor converts the RF signal output from the duplexer 800 to the baseband signal. The OFDM demodulator converts a time-domain signal output from the RF processor to a frequency-domain signal through Fast Fourier Transform (FFT).

The decoder 813 demodulates and decodes the signal output from the receiver 811 at a corresponding modulation level. Herein, the modulation level includes a Modulation and Coding Scheme (MCS) level.

The controller 820 allows the MS to communicate using the resource allocated from the macro BS or the hot zone BS. For example, when the BS checker 821 confirms the hot zone entrance, the controller 820 determines whether to hand over to the hot zone according to the movement speed fed from the speed detector 823. When the movement speed fed from the speed detector 823 is lower than or equal to the reference speed, the controller 820 controls the MS to hand over to the entered hot zone.

When the movement speed fed from the speed detector 823 is higher than the reference speed, the controller 820 is configured to communicate with the macro BS within the hot zone. In so doing, the controller 820 is configured to send the hot zone penetration request message including the hot zone entry information to the macro BS. Herein, the hot zone that the MS enters is included to the service coverage of the macro BS.

The BS checker 821 identifies the cell the MS enters according to the control signal received from the hot zone BS or the macro BS.

The speed detector 823 detects the movement speed of the MS.

The transmitting apparatus 830 includes an encoder 831 and a transmitter 833.

The encoder 831 encodes and modulates data or the control signal destined for the upper node at the corresponding modulation level.

The transmitter 833 converts the encoded and modulated signal output from the encoder 831 to an RF signal. For example, using the OFDM scheme, the transmitter 833 includes an RF processor and an OFDM modulator. Herein, the OFDM modulator converts a frequency-domain signal output from the encoder 831 to a time-domain signal through Inverse FFT (IFFT). The RF processor converts the baseband signal output from the OFDM modulator to an RF signal.

As constructed above, the controller 820 can function as the BS checker 821 and the speed detector 823. Herein, they are separately provided to distinguish their functions. In some embodiments, the controller 820 can process all or part of the functions of the BS checker 821 and the speed detector 823.

The following explains a structure of the macro BS for providing the service to the MS when the MS selectively hands over.

Figure 9:
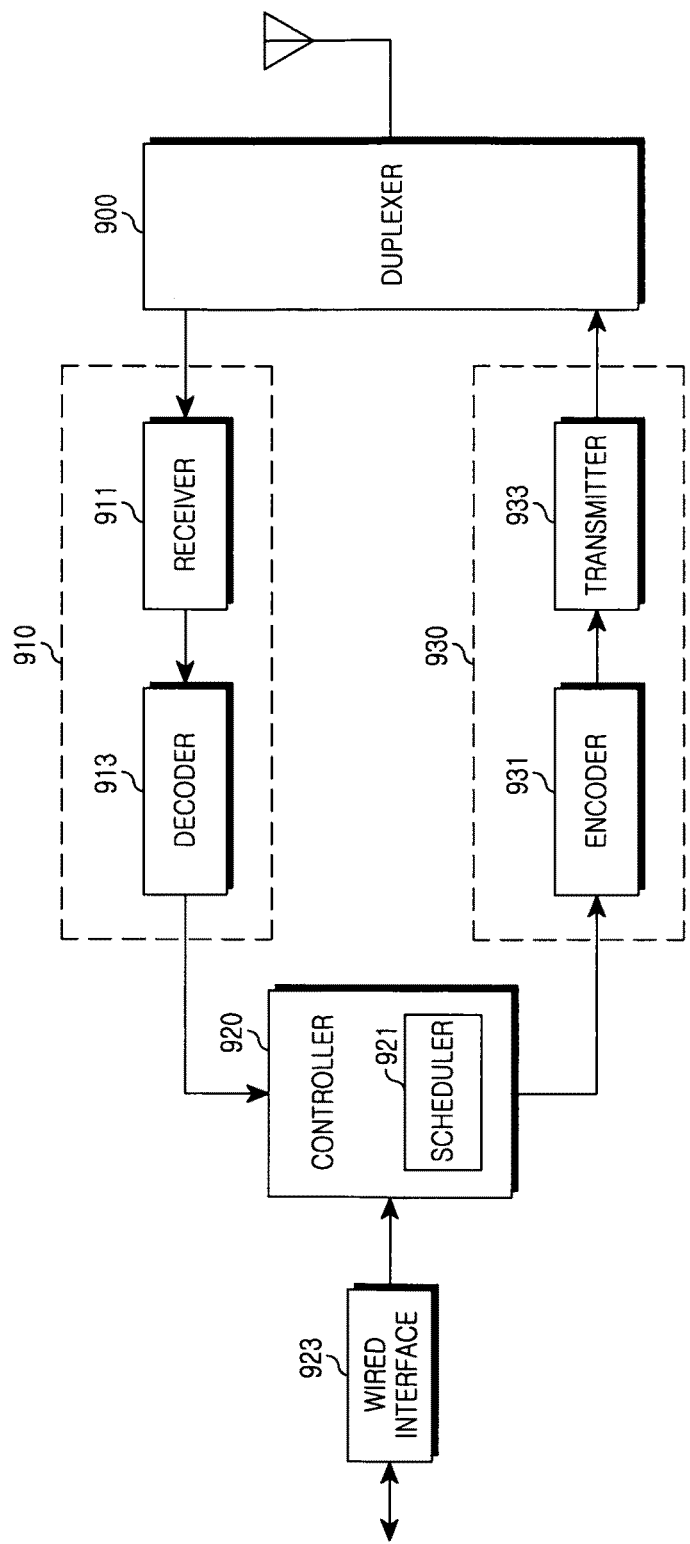
FIG. 9 illustrates a block diagram of a Base Station (BS) in the wireless communication system according to an exemplary embodiment of the present invention.

FIG. 9 illustrates a block diagram of the BS in the wireless communication system according to an exemplary embodiment of the present invention.

The macro BS of FIG. 9 includes a duplexer 900, a receiving apparatus 910, a controller 920, a wired interface 923, and a transmitting apparatus 930.

The duplexer 900 sends a transmit signal output from the transmitting apparatus 930 over an antenna and provides a receive signal from the antenna to the receiving apparatus 910 in the duplex manner.

The receiving apparatus 910 includes a receiver 911 and a decoder 913.

The receiver 911 converts an RF signal output from the duplexer 900 to a baseband signal. For example, using the OFDM scheme, the receiver 911 includes an RF processor and an OFDM demodulator. The RF processor converts the RF signal output from the duplexer 900 to the baseband signal. The OFDM demodulator converts a time-domain signal output from the RF processor to a frequency-domain signal through the FFT.

The decoder 913 demodulates and decodes the signal output from the receiver 911 at a corresponding modulation level.

The controller 920 allocates the resource for communicating with MSs to service, using a scheduler 921. For example, when the hot zone penetration request message including the hot zone entry information is received, the controller 920 checks whether the macro only resource can be allocated to the MS which sends the hot zone penetration request message. When the macro only resource can be allocated to the MS, the controller 920 allocates the macro only resource to the MS by use of the scheduler 921. Alternatively, when the hot zone penetration request message including the hot zone exit information is received, the controller 920 allocates the resource other than the macro only resource to the MS that sends the hot zone penetration request message using the scheduler 921. At this time, when there is no MS using the macro only resource, the controller 920 may not change the macro only resource allocated to the MS.

As allocating the macro only resource to the MS, the controller 920 transmits the information of the macro only resource allocated to the MS, to the hot zone BS or the hot zone BS group the MS enters via the wired interface 923.

The wired interface 923 transmits and receives signals to and from the neighboring macro BS and the hot zone BSs over the backbone network.

The transmitting apparatus 930 includes an encoder 931 and a transmitter 933.

The encoder 931 encodes and modulates data or the control signal destined for the upper node at the corresponding modulation level.

The transmitter 933 converts the encoded and modulated signal output from the encoder 931 to an RF signal. For example, using the OFDM scheme, the transmitter 933 includes an RF processor and an OFDM modulator. Herein, the OFDM modulator converts a frequency-domain signal output from the encoder 931 to a time-domain signal through the IFFT. The RF processor converts the baseband signal output from the OFDM modulator to an RF signal.

The hot zone BS is constituted the same as in the macro BS of FIG. 9. Correspondingly, when the hot zone BS is constructed as shown in FIG. 9, the duplexer 900, the receiving apparatus 920, the wired interface 923, and the transmitting apparatus 930 function the same as in the macro BS. Thus, their descriptions shall be omitted for brevity.

The controller 920 allocates the resource for communicating with MSs to service by use of the scheduler 921. In so doing, when the allocation information of the macro only resource is received through the wired interface 923, the controller 920 controls the scheduler 921 not to use the macro only resource. When the deallocation information of the macro only resource is received through the wired interface 923, the controller 920 checks whether there exists the MS which uses the macro only resource. Detecting that MS uses the macro only resource, the controller 920 controls the scheduler 921 to use the macro only resource.

In the above exemplary embodiments, the MS selectively hands over to the hot zone BS by considering its movement speed. Alternatively, the MS may selectively hand over to the hot zone BS by taking into account its location information.

As set forth above, in the wireless communication system where the small cell in the macro cell uses the same frequency band as the macro cell, the MS selectively hands over between the macro cell and the small cell. Therefore, the seamless communication can be serviced to the MS and the overhead in the handover can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A handover method of a Mobile Station (MS) in a wireless communication system in which at least one small cell resides in a macro cell, the method comprising:
    checking a movement speed of the MS in response to entering a neighboring small cell;
    determining whether to hand over to the small cell by taking into account the movement speed of the MS;
    transmitting small cell penetration information to a macro Base Station (BS), when determining not to hand over to the small cell, wherein the transmitting of the small cell penetration information to the macro BS comprises:
        handing over to the macro BS, when the macro BS is not a serving station; and
        transmitting small cell penetration information to the macro BS;
    communicating with the macro BS in the small cell using a macro only resource allocated from the macro BS;
    checking whether the MS is able to access the macro BS, when determining not to hand over to the small cell;
    handing over to the small cell, when not being able to access the macro BS; and
    transmitting small cell penetration information to the macro BS, when being able to access the macro BS.

2. The handover method of claim 1, wherein the determining whether to hand over to the small cell comprises:
    comparing the movement speed of the MS with a reference speed;
    determining not to hand over to the small cell, when the movement speed of the MS is higher than the reference speed; and
    determining to hand over to the small cell, when the movement speed of the MS is lower than the reference speed.

3. A resource allocation method of a macro Base Station (BS) in a wireless communication system in which at least one small cell resides in a macro cell, the method comprising:
    allocating a macro only resource not used by the small cell to the MS, when receiving small cell penetration information from a Mobile Station (MS); and
    communicating with the MS in the small cell using the macro only resource allocated to the MS,
    when there exists no MS that uses the macro only resource, maintaining the macro only resource allocated to the MS; and
    after allocating the resource other than the macro only resource to the MS, transmitting macro only resource deallocation information to the small cell where the MS travels over a backbone network.

4. The resource allocation method of claim 3, further comprising:
    after allocating the macro only resource to the MS, transmitting information of the macro only resource allocated to the MS, to the small cell the MS enters.

5. The resource allocation method of claim 3, further comprising:
    checking whether there exists an MS that uses the macro only resource, when receiving macro cell entry information from the MS which communicates in the small cell using the macro only resource; and
    allocating a resource other than the macro only resource to the MS which enters the macro cell, when there exists at least one MS that uses the macro only resource.

6. The resource allocation method of claim 5, further comprising:
    communicating with the MS using the macro only resource allocated to the MS when there exists no MS that uses the macro only resource.

7. The resource allocation method of claim 5, further comprising:
    after allocating the resource other than the macro only resource to the MS, transmitting macro only resource deallocation information to the small cell from which the MS migrates.

8. A resource allocation method of a small Base Station (BS) in a wireless communication system in which at least one small cell resides in a macro cell, the method comprising:
    controlling not to use the macro only resource, when receiving allocation information of a macro only resource not used by a small cell, from a macro BS;
    checking whether there exists a Mobile Station (MS) that uses the macro only resource, in response to receiving deallocation information of the macro only resource from the macro BS, wherein the MS checks whether the MS is able to access the macro BS in response to determining not to hand over to the small cell and the MS hands over to the small cell in response to not being able to access the macro BS and wherein the deallocation information of the macro resource is received when the MS is able to access the macro BS; and
    controlling to use the macro only resource, when there exists no MS which uses the macro only resource.

9. The resource allocation method of claim 8, further comprising:
  transmitting system information of the small BS and resource allocation information after an offset which is set by taking into account a system information transmission interval of the macro BS.

10. An apparatus of a Mobile Station (MS) in a wireless communication system in which at least one small cell resides in a macro cell, the apparatus comprising:
  a speed measurer configured to check a movement speed of the MS;
  a Base Station (BS) checker configured to identify a BS of a service coverage the MS enters; and
  a controller configured:
    to, when the BS checker confirms entrance to a neighboring small cell, determine whether to hand over to the small cell by taking into account the movement speed of the MS checked by the speed measurer,
    to communicate with a macro BS in the entered small cell using a macro only resource allocated by transmitting small cell penetration information to the macro BS when determining not to hand over to the small cell,
    to handover to the small cell when the MS is not able to access the macro BS, when determining not to hand over to the small cell and checking whether the MS is able to access the macro BS,
    to transmit small cell penetration information to the macro BS, when the MS is able to access the macro BS, and
    when no handover to the small cell is determined and the macro BS is not a serving station, to hand over to the macro BS before small cell penetration information is transmitted to the macro BS.

11. The apparatus of claim 10, wherein, the controller is configured to determine not to hand over to the small cell, when the movement speed of the MS measured at the speed measurer is higher than a reference speed, and
  the controller further is configured to determine to hand over to the small cell, when the movement speed of the MS measured at the speed measurer is lower than the reference speed.

12. An apparatus of a macro Base Station (BS) in a wireless communication system in which at least one small cell resides in a macro cell, the apparatus comprising:
  a scheduler configured to, when small cell penetration information is received from a Mobile Station (MS) through a receiver, allocate a macro only resource not used by the small cell to the MS;
  a transmitter configured to transmit a signal to the MS traveling in the small cell using the macro only resource allocated by the scheduler to the MS;
  the receiver configured to receive a signal from the MS traveling in the small cell using the macro only resource allocated by the scheduler to the MS, wherein, when there exists no MS that uses the macro only resource, the scheduler is configured to maintain the macro only resource allocated to the MS; and
  a wired interface configured to, after the scheduler allocates the resource other than the macro only resource to the MS, transmit macro only resource deallocation information to the small cell where the MS travels over a backbone network.

13. The apparatus of claim 12, further comprising:
  a wired interface configured to transmit information of the macro only resource allocated to the MS, to the small cell the MS enters over a backbone network.

14. The apparatus of claim 12, wherein, the scheduler allocates a resource other than the macro only resource to the MS which enters the macro cell, when macro cell entry information is received from the MS that communicates in the small cell using the macro only resource and there exists at least one MS that uses the macro only resource.

15. An apparatus of a small Base Station (BS) in a wireless communication system in which at least one small cell resides in a macro cell, the apparatus comprising:
  a receiver configured to receive a signal from a Mobile Station (MS);
  a transmitter configured to transmit a signal to the MS;
  a wired interface configured to communicate with a macro BS and at least one small BS; and
  a controller configured to:
    not use the macro only resource when allocation information of a macro only resource not used by a small cell is received from the macro BS through the wired interface, and
    use the macro only resource when deallocation information of the macro only resource is received from the macro BS and there exists no MS that uses the macro only resource, wherein the MS checks whether the MS is able to access the macro BS in response to determining not to hand over to the small cell and the MS hands over to the small cell in response to not being able to access the macro BS and wherein the deallocation information of the macro resource is received when the MS is able to access the macro BS.

16. The apparatus of claim 15, wherein the transmitter is configured to transmit system information of the small BS and resource allocation information after an offset which is set by taking into account a system information transmission interval of the macro BS.

* * * * *